US012571255B2

(12) United States Patent
Arling et al.

(10) Patent No.: US 12,571,255 B2
(45) Date of Patent: Mar. 10, 2026

(54) SYSTEMS AND METHOD FOR CONTROLLING WINDOW TREATMENTS

(71) Applicant: Universal Electronics Inc., Scottsdale, AZ (US)

(72) Inventors: Paul D. Arling, Scottsdale, AZ (US); Steve Gutman, Santa Ana, CA (US)

(73) Assignee: Universal Electronics Inc., Scottsdale, AZ (US)

(*) Notice: Subject to any disclaimer, the term of this patent is extended or adjusted under 35 U.S.C. 154(b) by 361 days.

(21) Appl. No.: 18/328,157

(22) Filed: Jun. 2, 2023

(65) Prior Publication Data

US 2024/0401408 A1 Dec. 5, 2024

(51) Int. Cl.
*E06B 9/68* (2006.01)

(52) U.S. Cl.
CPC ........ *E06B 9/68* (2013.01); *E06B 2009/6827* (2013.01); *E06B 2009/6836* (2013.01)

(58) Field of Classification Search
CPC ............... E06B 9/68; E06B 2009/6827; E06B 2009/6836; E06B 2009/6818
See application file for complete search history.

(56) References Cited

U.S. PATENT DOCUMENTS

| | | | | |
|---|---|---|---|---|
| 9,834,984 B2 | 12/2017 | Fiedler et al. | | |
| 10,539,336 B2 | 1/2020 | Hoffman | | |
| 10,626,668 B2 | 4/2020 | Hall et al. | | |
| 11,333,385 B1 | 5/2022 | Thibault | | |
| 2009/0020233 A1* | 1/2009 | Berman | E06B 9/56 | 318/446 |
| 2011/0164304 A1* | 7/2011 | Brown | E06B 9/66 | 359/275 |
| 2015/0234369 A1* | 8/2015 | Wen | F24F 11/63 | 700/278 |
| 2015/0284992 A1 | 10/2015 | Hall et al. | | |
| 2016/0200812 A1 | 7/2016 | Jiang | | |
| 2019/0119978 A1* | 4/2019 | Hall | H04L 12/2818 | |

(Continued)

FOREIGN PATENT DOCUMENTS

| | | |
|---|---|---|
| CN | 109555459 A | 4/2019 |
| CN | 110359831 B | 12/2021 |

OTHER PUBLICATIONS

International Search Report and Written Opinion of application No. PCT/US24/27231, dated Aug. 28, 2024, 13 pp.

(Continued)

*Primary Examiner* — Christopher E. Everett
(74) *Attorney, Agent, or Firm* — Greenberg Traurig, LLP

(57) ABSTRACT

A controller receives from a sensor associated with a window treatment a first data obtained during a controlled closing of the window treatment. A setpoint temperature, a current temperature within a structure, and a weather data is subsequently used to determine that the window treatment needs to be closed in order to hasten a movement of the current temperature towards the setpoint temperature. After an instruction is provided to cause the window treatment to start to close, second data is obtained from the sensor while the window treatment is being closed. The first data is compared to the second data, when the comparison indicates that an obstruction exists in a path of travel of the window treatment, the closing of the window treatment is stopped.

11 Claims, 2 Drawing Sheets

(56) References Cited

U.S. PATENT DOCUMENTS

2021/0163581 A1 6/2021 Zhang
2023/0203883 A1* 6/2023 Hebeisen .................. E06B 9/68
160/6

OTHER PUBLICATIONS

Ppenhab, Motorized Blind recommendations, printed from www on Jun. 1, 2023, 4 pages, https://community.openhab.org/t/motorized-blind-recomendations/29389/4.

* cited by examiner

SYSTEMS AND METHOD FOR CONTROLLING WINDOW TREATMENTS

BACKGROUND

The present application relates generally to the heating, ventilation, and air conditioning arts and, more specifically, to systems and method for controlling window treatments, such as blinds, shutters, drapes, etc. in connection with these arts.

Systems and methods for controlling motorized window treatments are generally known. See, for example, CN 110359831 and CN 109555459. Additionally, systems and method for calculating, conveying information about, and heating/cooling structures according to expected thermal responses are generally known. See, for example, U.S. Pat. Nos. 10,539,336 and 11,333,385.

For the sake of brevity, the description within each of these documents is incorporated herein by reference in its entirety.

SUMMARY

In a described, example system, a controller receives from a sensor associated with a window treatment a first data obtained during a controlled closing of the window treatment. A setpoint temperature, a current temperature within a structure, and a weather data is subsequently used to determine that the window treatment needs to be closed in order to hasten a movement of the current temperature towards the setpoint temperature. After an instruction is provided to cause the window treatment to start to close, second data is obtained from the sensor while the window treatment is being closed. The first data is compared to the second data, when the comparison indicates that an obstruction exists in a path of travel of the window treatment, the closing of the window treatment is stopped.

In further examples, the window treatment is automatically caused to close as a function of time of day, as a function of the weather forecast alone, or the like. In all such situations, it is again preferred that movement of the window treatment be monitored to determine if such movement needs to be stopped.

BRIEF DESCRIPTION OF THE DRAWINGS

The features, advantages, and objects of the subject disclosure will become more apparent from the detailed description as set forth below, when taken in conjunction with the drawings in which like referenced characters identify like elements throughout, and wherein.

DETAILED DESCRIPTION

Embodiments of the subject disclosure are directed towards improved systems and methods for controlling one or more window treatments, such as blinds, shutters, drapes, etc. In particular, the systems and methods will control the positioning of one or more window treatments, considering an expected thermal response, to provide a structure with desired environmental settings. As used herein, an expected thermal response comprises expected temperatures of ambient air inside a structure over time, and/or an expected energy consumption of HVAC equipment during heating and cooling cycles. While an expected thermal response generally comprises expected air temperatures over time in an area controlled by a thermostat as a heating system or a cooling system is actively heating or cooling a room or structure, respectively, it may also refer to expected temperatures in a room or structure when a heating or cooling system is not actively heating or cooling a room, i.e., when passive heating/cooling within a structure is occurring.

Figure 1:
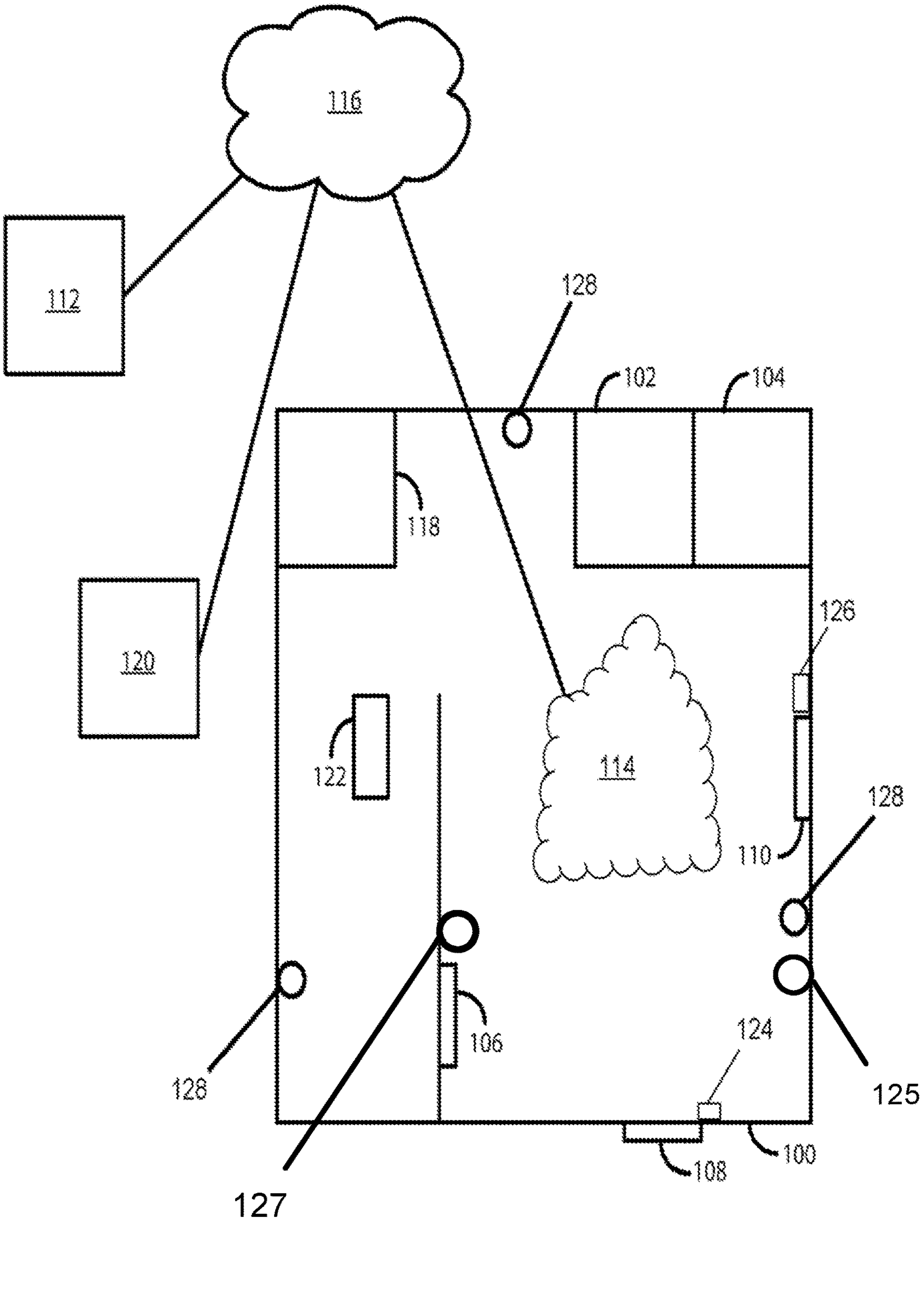
FIG. 1 is a top, plan view of a structure utilizing the concepts discussed herein.

FIG. 1 is a top, plan view of a structure 100 utilizing the concepts discussed herein. In this example, structure 100 comprises a multi-room, single-story residence having a heating system 102, a cooling system 104, and a thermostat 106 that controls heating system 102 and cooling system 104. Structure 100 also comprises at least one entry door 108 and one window 110 that may be monitored by a security system comprising a controller 118. The controller 118 receives data from various sensors, such as a door sensor 124, a window sensor 126, a temperature sensor 125, a light sensor 127, and/or other sensors 128 as desired, and the sensors may be positioned within and without the structure 100. In addition, the controller 118 may receive data from thermostat 106 when the devices are not integrated.

In an example, a first sensor 128 could be an occupancy or motion sensor that operates based on movement, a second sensor 128 could be a carbon dioxide detector that detects the level of carbon dioxide in the ambient air and reports the level to controller 118, a third sensor 128 could be a humidity sensor, a further sensor 128 could be a light sensor, etc. Controller 118 preferably provides home automation functionality using the data received from such sensors, such as automatically turning lights on and off as people enter and leave structure 100, automatically controlling the positioning of one or more window treatments, automatically opening or closing windows, and the like. Controller 118 can thus automatically turn a light on in a room where a sensor 128 detects movement or an increase in carbon dioxide, automatically turn the light off when movement is no longer detected or carbon dioxide levels decrease, automatically turn the light off when the light sensor senses sunshine indicates lighting is not needed, etc.

It is to be understood that controller 118 can be integrated with the thermostat 106 or can be a device that is separate, in whole or in part, from the thermostat 106. Accordingly, elements and/or steps described as being a part of or performed by the controller 118 can be considered to be a part of or performed by the thermostat 106 as appropriate for any given embodiment and elements and/or steps described as being a part of or performed by the thermostat 106 can likewise be considered to be part of or performed by the controller 118. In addition, the controller 118 and/or thermostat 106 can perform processing locally or in whole or in part in cooperation with additional devices/services within the home and/or exterior to the home.

Each of the door sensor 124, the window sensor 126, and sensors 128 typically comprise standard, wireless, prior art sensors, such as door and window security sensors, motion detectors, occupancy sensors, carbon dioxide sensors, light sensors, temperature sensors, humidity sensors, cameras, etc. In one example, thermostat 106 uses one or more signals from these sensors to calculate, or modify, expected thermal responses. The signals may be received via one or more wireless receivers within thermostat 106, such as receivers that utilize well-known wireless protocols such as Zwave®, Zigbee®, Wi-Fi, professional security protocols (such as those used by Honeywell®, 2Gig® and Tyco/DSC), Wi-Fi, and others. In some embodiments, thermostat 106 may be configured to receive two or more temperature sensor inputs from temperature sensors located in other parts of structure 100.

Thermostat 106 may be programmed with one or more "setpoints" in the form of desired temperatures and times when the desired temperatures should be achieved. For example, a user may program thermostat 106 with several setpoints. As examples: a "wake" setpoint to warm a room to 74 degrees Fahrenheit at 7 am when the user typically wakes; a "leave" setpoint to maintain a temperature of no less than 62 degrees at 8:30 am when the user leaves structure 100 to go to work; a "return" setpoint to set the room temperature to 74 degrees Fahrenheit at 6 pm when the user typically returns from work; and a "retire" setpoint to maintain a room temperature of no less than 60 degrees Fahrenheit at 10 pm when the user typically goes to bed. As each of the times set by the user in the setpoint near, thermostat 106 sends signals to heating system 102 or cooling system 104 to begin or stop heating or cooling, depending on the current ambient air temperature measured by thermostat 106 (and/or as measured by one or more structure internal and/or external temperature sensors 125) and the desired setpoint temperature.

The term "setpoint" may additionally be used to describe a desired temperature setting manually entered by a user in order to change a current ambient air temperature to the temperature entered by the user, e.g., entered as a temporary override of the thermostat programming described above.

To achieve the temperature setpoints at the times specified in the setpoint, thermostat 106 typically begins heating or cooling before the setpoint time for each setpoint. In some instances, the thermostat 106 and/or controller 118 can cause window treatments to be opened or closed to assist in achieving a temperature setpoint at a time specified. In this way, the desired room temperature is often achieved by the time the setpoint time is reached. This is known in the art as "thermal ramping" or simply, "ramping," Thermostats may be pre-programmed to begin ramping a predetermined, fixed time period before each setpoint time, such as 15 minutes or 30 minutes. Thermostats may also alter the start time of such ramping, as described by U.S. patent application Ser. No. 15/859,573 incorporated by reference herein, depending on various conditions, both current and historical.

Thermostat 106 may predict the ambient air temperature during heating and cooling cycles, including any ramping that may occur, for future setpoints, based on a current or expected ambient temperature of an area within structure 100 and on the desired setpoint temperature of each setpoint. In one example, thermostat 106 calculates a number of expected temperatures vs. time during heating and cooling cycles, and then simplifies and formats the expected temperatures into a graphical format for display on thermostat 106 and/or on some other device, such as a mobile device 122. Mobile device 122, which may include an app that is usable with the controller 118/thermostat 106, may communicate with the controller 118/thermostat 106 via use of a local area network 114 and/or via use of a wide area network 116. Further, thermostat 106 may calculate and convey to a user an expected energy consumption rate by heating system 102 or cooling system 104 during a current or future heating or cooling cycles. Yet further, the thermostat 106, alone or in combination with controller 118, may control one or more window treatments, preferably using data received from one or more sensors 128 within and without the structure, from an external weather server 112, etc., to facilitate the attaining of the desired setpoint in the most economical and/or quickest manner.

As noted, expected thermal responses may be calculated using one or more factors, such as the ambient temperature in an area of structure 100 monitored by thermostat 106, each desired setpoint temperature, a capacity of heating system 102 and cooling system 104, current or future outdoor temperatures as obtained from external sensors and/or weather forecasting services hosted on a weather server 112, results from previous heating and cooling cycles, and door and window status (i.e., whether one or more doors or windows are open or closed), widow treatment status, etc.

In one embodiment, thermostat 106 is coupled to the weather server 112 via a local area network (LAN) 114, established by a router/modem, which is, in turn, connected to a wide-area network 116, such as the Internet. Thermostat 106 may be provided with current and future weather conditions in a geographic area where structure 100 is located. Such current and future weather conditions may comprise an outdoor temperature, humidity, precipitation information, wind speed, wind direction, cloud coverage, sunrise time, sunset time, and other current and future conditions. Thermostat 106 may be programmed by a user with information pertaining to the thermostat's location, typically by entry of a city and state, or the location may be determined by weather server 112 based on an IP address of a router/modem or an IP address assigned to thermostat 106 by a router/modem. In any case, weather server 112 provides current and future weather and the like information to thermostat 106 upon request from thermostat 106, for example at predetermined time intervals, or on a "push" basis as updates become available from weather server 112. Thermostat 106 may use such current or future weather conditions to alter one or more desired setpoint temperatures.

Figure 2:
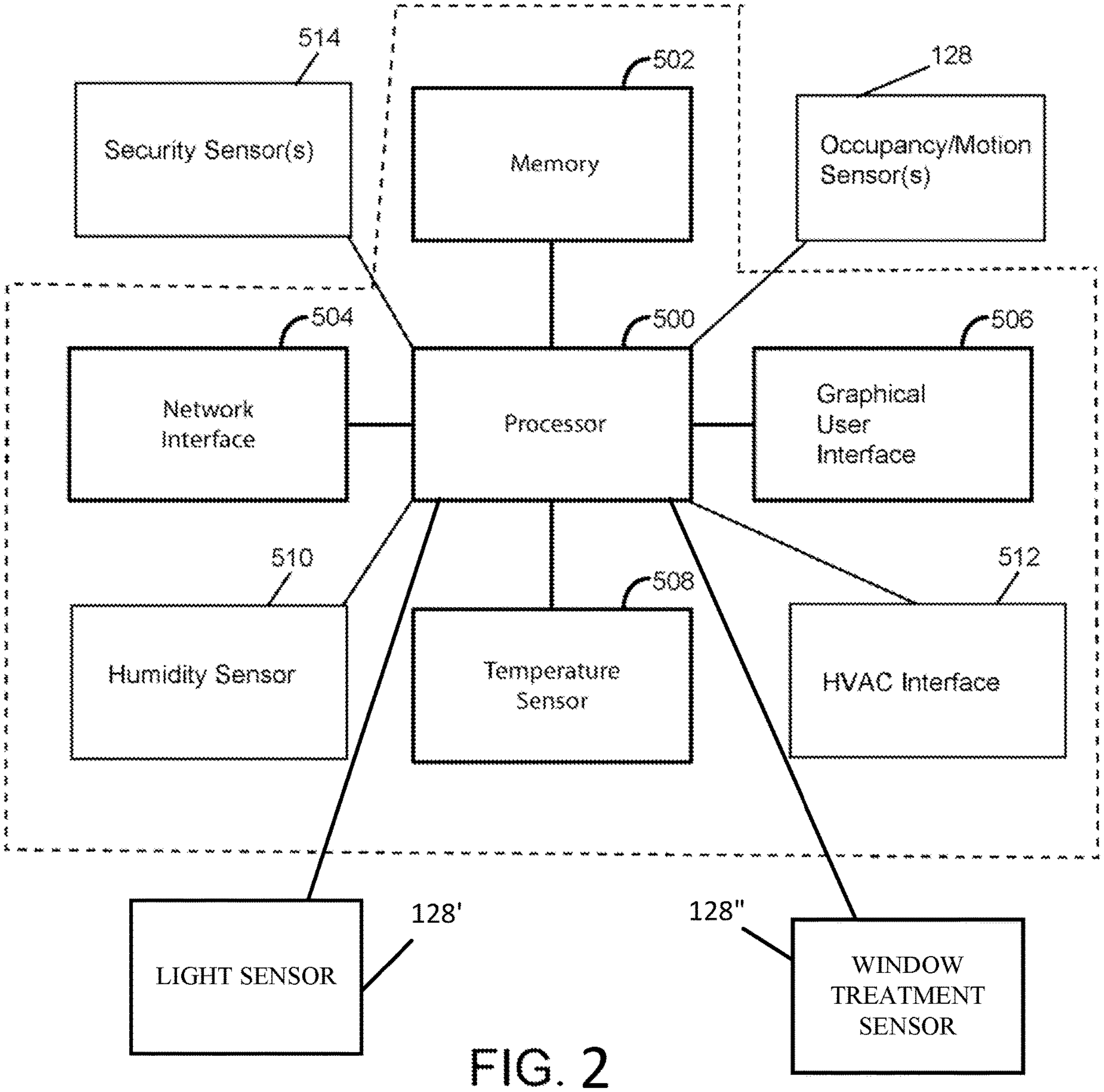
FIG. 2 is a functional block diagram of one embodiment of a controller as shown.

FIG. 2. is a functional block diagram of one embodiment of thermostat 106, illustrating processor 500, memory 502, network interface 504, graphical user interface 506, temperature sensor 508, humidity sensor 510, and HVAC interface 512. In some embodiments, thermostat 106 may be electronically coupled to one or more security sensors, such as one or more door or window sensors and/or motion sensors, one or more light sensors, one or more window treatment positional sensors, etc. either through a dedicated, prior art receiver or via network interface 504. It should be understood that in some embodiments, some functionality has been omitted from FIG. 2 for purposes of clarity, such as a power supply. It should be further understood that the functionality to calculate, summarize, and present expected thermal responses, to control the devices within the structure 100, and the like, could alternatively be performed by mobile device 122, a remote server 120, etc., either alone or in connection with another device.

Processor 500 comprises one or more general-purpose microprocessors, microcontrollers and/or custom or semi-custom ASICs, and/or discrete components able to carry out the functionality required for operation of thermostat 106. Processor 500 may be selected based on processing capabilities, power-consumption properties, and/or cost and size considerations. In the case of a microprocessor, microcontroller, or ASIC, processor 500 generally executes processor-executable instructions stored in memory 502 that control the functionality of the intelligent personal assistant. Examples of memory include one or more electronic memories such as RAM, ROM, hard drives, flash memory, EEPROMs, UVPROMs, etc. or virtually any other type of electronic, optical, or mechanical memory apparatus, but excludes propagated signals. In some embodiments, memory 502 may be incorporated into processor 500, such as in the case of a microcontroller having a certain amount of onboard static RAM, flash memory, or some other electronic memory capable of storing the processor-executable instructions and variable information, such as setpoint information, current and future weather information, door/window status information, past ramping historical information (i.e., previous ramp information and the conditions that produced the previous ramp information, such as indoor/outdoor temperatures, door/window status, occupancy information, etc.).

Network interface 504 comprises circuitry necessary to send and receive information to and from other devices coupled to the LAN 114, such as controller 118, door sensor 124, window sensor 126, mobile device 122, heating system 102, cooling system 104, occupancy sensors 128, and/or to entities outside LAN 114, such as weather server 112, server 120, and to mobile device 122 when mobile device 122 is outside LAN 114. Mobile device 122 comprises a smart phone, tablet computer, desktop computer, laptop computer, or other personal data apparatus executing an "app" for controlling thermostat 106, for entering setpoint information, for presenting expected thermal ramps graphically, etc. Such network interface circuitry is well known in the art and may comprise one or more of BlueTooth, Wi-Fi, or RF circuitry, among others.

Graphical user interface 506 comprises an electronic display that allows a user to operate thermostat 106, (i.e., to program setpoints, to manually adjust temperature, etc.) to enter information that may be used by thermostat 106 (such as a location of structure 100, a square footage of structure 100, a capacity of heating system 102 and/or cooling system 104, security sensor information, etc.) and to display expected thermal responses. Typically, graphical user interface 506 comprises a touch screen, widely used in most smart phones, thermostats, and other electronic devices on the market today.

Temperature sensor 508 comprises a sensor that provides electronic signals to processor 500 in accordance with the ambient air temperature surrounding thermostat 106. In some embodiments, temperature sensor 508 is not used, and thermostat 106 receives temperature readings from one or more temperature sensors located in one or more locations inside structure 100. Temperature sensor 508 may comprise one of a thermistor, a resistive temperature detector, a thermocouple, semiconductor-type apparatus, or other temperature sensors known in the art.

Humidity sensor 508 comprises an optional electronic sensor that provides electronic signals to processor 500 in accordance with ambient humidity conditions surrounding thermostat 106. In some embodiments, humidity sensor 508 is not used, and thermostat 106 receives humidity readings from one or more humidity sensors located in one or more locations of structure 100. Humidity sensor 508 may comprise one of a capacitive sensor, a resistive sensor, a thermal sensor, a gravimetric sensor, an optical sensor, or some other humidity sensor known in the art. Humidity sensors may also be positioned external to the structure 100 and data from such sensors can be utilized, for example, to determine if a window should be opened or closed.

HVAC interface 512 comprises circuitry to communicate with heating system 102 and/or cooling system 104. In one embodiment, HVAC interface 512 comprises well-known circuitry to communicate with systems 102 and 104 via two or more wires. In other embodiments, HVAC interface 512 comprises wireless radio frequency circuitry to communicate with system 102 and/or 104 wirelessly, such as popular Zwave® or Zigbee® communication chips. In yet still other embodiments, HVAC interface 512 is not needed, and thermostat 106 communicates with system 102 and/or 104 via a network interface and LAN 114.

Security sensor(s) 514 comprise door and window sensors, window treatment positional sensors, and/or motion sensors. Such sensors can determine when one or more doors or windows or window treatments are open or closed, which may impact the shape and ramp times of expected thermal responses. For example, if it is 40 degrees outside and a window is open, and thermostat is attempting to warm structure 100 to 72 degrees, it may take longer for heating system 102 to warm structure 100 to the desired setpoint temperature, as cold air from outside may enter structure 100 through the open window. The shape and ramp times of expected thermal responses could be further impacted if two or more doors or windows are open. Thermostat 106 may use status information of the security sensor(s), in combination with outdoor air temperatures, predicted cloud cover, etc. to calculate expected thermal responses and to control the doors/windows/window treatments as needed, e.g., to automatically shut a window or close/open a window treatment to quicken the expected thermal response.

Occupancy sensor(s) 128 comprise one or more occupancy sensors, motion detectors, carbon monoxide detectors, cameras, or any other prior art device that can detect the presence of people inside structure 100. In one embodiment, thermostat 106 is capable of receiving wireless signals from the sensor(s) and using this information to generate or modify expected thermal responses. Generally, the more people inside structure 100 the more heat is generated by their bodies, warming the ambient air inside structure 100.

Explained now is an example method, performed by thermostat 106, for controlling the ambient air temperature. It should be understood that the steps described in this method could be performed in an order other than what is discussed and that some minor method steps may have been omitted for clarity and simplicity. It should also be understood that the functionality described in this method may be performed by thermostat 106/controller 118 or by a remote server in communication with thermostat 106/controller 118, such as remote server 120, and that reference to thermostat 106 and/or controller 118 and its components can apply equally to such a remote server 12.

The method begins by programming smart thermostat 106 by a user, such as entering certain information, such as setpoint days, times and temperatures, a current day and time, a location of structure 100, an electronic address of a weather server, such as an IP address of weather server 112, orientation information (i.e., a compass direction where one or more windows and/or areas whose ambient air temperature is controlled by thermostat 106 is facing, i.e., "north", "north-west", 270 degrees, etc.), and other information related to the operation of thermostat 106 as needed.

In an example, processor 500 determines a start time for attaining a setpoint temperature. The start time may be different than the desired setpoint time of 8 am. For example, thermostat 106 may be programmed for a desired setpoint temperature of 72 degrees to control the ambient air temperature beginning at 8 am, and in some cases, the start time is a predetermined time before the desired setpoint time in order to achieve the desired setpoint temperature at the desired setpoint time, such as 30 minutes, or 7:30 in this example. The start time for processor 500 to use to attain the setpoint temperature may comprise a fixed time stored in memory 502 entered either by the factory that manufactured thermostat 106 and/or by a user of thermostat 106 using either graphical user interface 506 or mobile device 122. For example, thermostat 106 may be manufactured with a default start time of 11 am for cooling structure 100 during warm weather, as 11 am is typically when the effects of the sun begin to affect temperatures inside buildings such as structure 100. In another embodiment, a user may determine that it begins to get hot in structure 100 at 11:30 am, due to the sun rising in the sky and the orientation of windows towards the sun. The user may enter 11:30 as the start time for smart thermostat 106 to begin using the setpoint temperature, overriding, in one embodiment, a factory setting of 11:00 am. In another example, processor 500 automatically determines the start time for attaining a setpoint temperature by determining a time of day. For example, in a cooling application during warm weather, processor 500 may determine that the temperature inside structure 100 begins to ramp upwards beginning at 12 pm by reading previously-stored temperature readings from temperature sensor 508. In response, processor 500 may determine a start time of 12 μm to start a cooling process to lower or maintain the temperature.

In some embodiments, the desired setpoint temperature and/or the start time, may be determined, or changed, automatically by processor 500 in accordance with one or more setpoint modification factors, such as the location of structure 100, the orientation of structure windows, a current or future controlled window treatment state, the current day, month or season, an orientation to the sun of one or more areas, current and/or future weather forecast, etc. Processor 500 may change the start time once per year, once per season, monthly, weekly, daily or on some other automated schedule, and the start time could be changed by an hour per season, a minute per week, 30 seconds per day, or some other time period. For example, if a user programs thermostat 106 with a start time of 11 am, processor 500 may automatically change the start time to 11:15 am when processor 500 determines that it is late summer (i.e., by determining, for example, that it is September 20th) and, accordingly, that the temperatures in structure 100 may not be getting as hot as during the peak summer months. Similarly, processor 500 may automatically determine that it is early summer (i.e., by determining, for example, that it is June 21) and, in response, change the start time from 11 am to 10:45 am, as the temperatures in structure 100 may be starting to warm up quickly more towards an earlier portion of the morning.

In another example, processor 500 may automatically alter the desired setpoint temperature and/or start time in accordance with a location of structure 100 (i.e., the same location on earth as thermostat 106). For example, if structure 100 is located in Miami, Fla., processor 500 may alter the setpoint temperature to account for the warmer temperatures of southern Miami. Similarly, processor 500 may automatically set a setpoint temperature if structure 100 is located in Portland, Me., to account for the lower overall temperatures of that geographic area. In another embodiment, the location information is used to alter the start time of the setpoint temperature by an amount to compensate for the differences in sunup/sundown times caused by locations in different latitudes. For example, if a setpoint comprises a start time of 8 am, processor 500 may adjust the setpoint start time to an earlier time during summer months in structures located in northern latitudes, due to the earlier sun rises and later sun sets experienced in, say, Seattle, Wash., and adjust the setpoint start time to a later time during summer months in structures located in southern latitudes, due to the later sun rises and earlier sun sets experienced in, say, San Diego, Calif. Processor 500 may determine the location of structure 100 by reading location information stored in memory 502, previously entered by a user, or use some other well-known technique, such as using an IP address of a router/modem associated with LAN 114.

In another example, processor 500 may automatically change the desired setpoint temperature and/or start time based on current or future weather conditions in proximity to structure 100. In this embodiment, processor 500 receives current and/or future weather reports from weather server 112 via network interface 504 based on location information of structure 100 as stored in memory 502, such as current or future temperatures, precipitation amounts, wind speeds, cloud conditions, etc. Processor 500 may then use the current or future weather conditions to modify the desired setpoint temperature and/or start time, and/or window treatment states to better control the ambient air temperatures in structure 100.

For example, if it is August in San Diego, Calif. at 6 am, and the desired setpoint temperature is 72 degrees, and processor 500 has been using a setpoint temperature of 68 degrees beginning at 11 am each day, processor 500 may receive a forecast from weather server 112 at 6 am that calls for clouds and rain in the afternoon, and/or forecasts cooler weather that afternoon. In response, processor 500 may change the modified setpoint temperature from 68 degrees to 70 degrees, because structure 100 is not likely to get as hot in the afternoon during cool, cloudy and rainy weather outside as it would ordinarily get on a hot summer day. Similarly, processor 500 could change a desired or modified setpoint temperature, temperature delta, window treatment state, and/or start time as soon as an updated current or future weather conditions are received.

Having described the various ways processor 500 may use the location of structure 100, the current day, month or season, an orientation to the sun, and current and/or future weather conditions to change a desired setpoint temperature and/or setpoint time, it should be understood that processor 500 could use a combination of the aforementioned to control the ambient air temperature in structure 100. For example, processor 500 may use a current season and orientation information together to change a desired setpoint temperature and/or setpoint time.

In another embodiment, processor 500 may determine a continuous modification of the desired setpoint temperature to combat the effects of the sun as it rises, peaks and falls. For example, at 6 am, the sun may have a negligible effect on structure 100, while at 2 pm, perhaps the hottest time of the day, the ambient air temperature inside the structure may be dramatically increased. This effect may be even more profound as the orientation of the windows of the structure point towards the south (in the northern hemisphere; vice-versa for structures located in the southern hemisphere) as the structure is heated directly by the sun's rays, even with the window treatments being automatically closed. The continuous change may occur linearly or in accordance with a predetermined graphical representation, such as a half-sinusoid that matches the path that the sun makes across the sky. Processor 500 may modify the desired setpoint temperate continuously and, in this case in the form of a half sinusoid, beginning at around 9:30 am, just as the sun begins to affect the ambient air temperature in structure 100, modifying the desired setpoint temperature from 72 degrees to about 69 degrees at about noon and then back to 72 degrees at around 5 pm. This waveform may resemble a path how the sun rises and falls throughout a day.

In one embodiment, thermostat 106 uses future weather information in conjunction with past heating and cooling cycle information to determine expected thermal responses. Thermostat 106 may store previous heating and cooling information, such as setpoints, heat/cool ramp start times, resultant room temperature(s) and outdoor temperature information during the ramps to determine a relationship between room temperatures, outdoor temperatures, desired room temperatures and the time it takes to ramp to such desired room temperatures.

Thermostat 106 may utilize current and future weather information, and/or past heating and cooling cycle information, and/or door and/or window status information to determine expected thermal responses. In this embodiment, a status of one or more doors and/or windows is provided to thermostat 106, either directly via wireless sensors that monitor doors or windows in structure 100, or via controller 118. The status of each door or window comprises either "open" or "closed". In some embodiments, an amount that a door or a window is open may also be provided, such as "18 inches", or "3 feet, 6 inches" in embodiments where such detailed status information is provided by the sensors. Thermostat 106 may record resultant room temperatures during thermal ramping and additionally record the status of one or more doors or windows. Such door and/or window status information may skew the time needed to achieve setpoints. For example, if the outdoor temperature is 30 degrees, and the indoor room temperature is 60 degrees, and a desired room temperature at 7 am is 72 degrees, a ramp time may be determined to be 40 minutes. However, if a window is open, cold air from outside will enter through the open window and hamper the heating system's effort to bring the room to the desired temperature. In this case, thermostat 106 tracks the room temperature during the ramp, and stores certain parameters from the ramp, such as how long it actually took to achieve the desired temperature, based on the outdoor temperature, the starting room temperature, the desired room temperature, a plurality of temperatures vs. time during the ramp, and the fact that one window was open. Then, the next time that similar circumstances present, i.e., the same or similar outdoor temperature, one window open, starting room temperature, and desired room temperature, thermostat 106 may alter the ramp time, for example to 50 minutes, in order to achieve the desired room temperature at the desired setpoint time.

As noted, the calculations performed by thermostat 106 to determine expected thermal responses may be performed by some other apparatus or system, such as a remote server, e.g., a computer server in the cloud that is coupled to thermostat 106 via wide-area network 116 and local-area network 114. The remote server receives certain information from thermostat 106, such as current room temperatures, previously stored setpoints, setpoint information, previously-stored thermal responses, occupancy information, door/window status information, etc. for use in calculating expected thermal responses and providing such expected thermal responses to thermostat 106 and/or to some other device. The remote server may also be coupled to weather server 112 to receive current and future weather information, in order to use such information to better control heating and cooling of an area inside structure 100, as described previously.

In connection with controlling the environment within the structure 100, a user may also enter information into thermostat 106 regarding structure 100 and heating system 102 and/or cooling system 104. Regarding structure 100, the user may enter the square footage of structure 100, a number of doors and/or windows, a location (i.e., zip code, GPS coordinates, area code, etc.), one or more materials that structure 100 is made from, a date that structure 100 was constructed, etc. Regarding heating system 102 and/or cooling system 104, the user may enter a capacity (i.e., kilowatts, tons, BTU, etc.), one or more fan speeds, a brand name, model name, model number, etc.). Processor 500 receives the structure and heating/cooling system information and stores it in memory 502. In one embodiment, processor 500 may access a remote web server via network interface 504 to download energy consumption information of a particular model of heating system 102 and/or cooling system 104. Processor 500 then stores this information into memory 502.

Thermostat 106 may further be capable of storing indicia of doors and windows monitored by security sensors 514, for example, a front entry door monitored by a first security sensor 514 may be labeled "Front Door" and a window next to the front door monitored by a second security sensor 514 labeled "Window Near Front Door". Alternatively, or in combination, the indicia may comprise a photograph of at least some doors and windows monitored by security sensors 514, photographed by a user and provided to processor 500 for identifying doors and windows within structure 100.

Thermostat 106 may further be programmed to enter a number and type of security sensors and/or occupancy sensors.

Processor 500 may receive current weather conditions from weather server 112. Current weather conditions may also or alternatively be received from a local temperature sensor installed outside of structure 100 and in communication with local-area network 114. In any case, processor 500 receives current weather conditions and typically stores the current weather conditions in memory 502. Such current weather conditions comprise temperature, barometric pressure, wind direction and/or speed, precipitation indications, and/or cloud coverage indications.

Processor 500 may receive future weather forecasts from weather server 112. Such future weather forecasts may comprise predicted temperatures barometric pressures, wind directions and/or speed, precipitation indications, and/or cloud coverage indications. Such future weather information may be provided as an hourly or daily forecast, extending into the future a number of days, such as ten days. For each time period (hour or day), predicted weather information may be provided by weather server 112, as weather predictions are generated by weather server 112. In one embodiment, one or more weather prediction updates are provided to processor 500 at predetermined time intervals, such as one hour or one day. In other embodiments, weather predictions are provided to processor 500 upon processor 500 requesting such weather prediction information from weather server 112 at predetermined time intervals, or upon the occurrence of a predetermined event, such as a user requesting an update via graphical user interface 506 or mobile device 122.

Processor 500 may calculate one or more expected thermal responses in connection with one or more of the setpoints stored in memory 502, based on one or more factors, as discussed herein. In some embodiments, expected thermal responses are calculated shortly before each setpoint time is reached, or a time that heating system 102 or cooling system 104 begins a temperature ramp, e.g., approximately 15 minutes prior to each setpoint time. For example, if a "wake" setpoint is set for 7 am, processor 500 may calculate an expected thermal response, for that setpoint only, at about 20 minutes before 7 am (i.e., 5 minutes before heating system 102 or cooling system 104 begins a heating or cooling cycle, respectively), and similarly calculate expected thermal responses for other setpoints just before their setpoint times, respectively. Processor 500 may additionally calculate an expected thermal response in response to receiving manual input from a user to manually change the current ambient air temperature, or to change the desired setpoint temperature during a heating or cooling cycle. In these cases, processor 500 uses the current ambient temperature as starting point of an expected thermal response and the desired temperature as entered by the user to generate an expected thermal ramp. Processor 500 may generate a new expected thermal ramp each time a user enters a new desired temperature. For example, if the ambient air temperature is 78 degrees, and the use desires 72 degrees, the user may touch a portion of graphical user interface 506 representing a decrease in air temperature, one degree at a time. As the user presses once, causing the desired temperature to fall to 77 degrees, processor 500 may generate and display an expected thermal response, using the current ambient air temperature of 78 degrees as a starting point of the expected thermal response and using 77 degrees as an end point of the expected thermal response. As the user continues to modify the desired temperature, pressing once for each decrease in desired temperature, processor 500 re-calculates an expected thermal response, using the current ambient air temperature as a start point and using the just-entered temperature by the user. The user may enter the desired temperature in just a few seconds by, in this case, six touches of graphical user interface 506, so that one of six different expected thermal responses will be calculated, simplified and displayed as the user touches graphical user interface 506 each time, respectively.

In one embodiment, expected thermal ramps are calculated using the ambient temperature in proximity to thermostat 106 (and/or one or more thermal sensors coupled to thermostat 106) at or before the start of each thermal ramp, and the desired setpoint temperature of each setpoint. In this case, processor 500 calculates a series of expected temperatures over time during a heating or cooling cycle, i.e., between the time that a thermal ramp begins and an expected time that the setpoint temperature is reached. It should be understood that a thermal ramp may begin prior to a setpoint time being reached, in order to allow time for heating system 102 and/or cooling system 104 to attain the desired setpoint temperature by the setpoint time. This time may be referred to herein as a thermal ramp start time, typically equal to about between 10-20 minutes.

The calculation performed by processor 500, in the case described above, may comprise determining a series of expected temperatures linearly from the ambient temperature to the desired setpoint temperature. In some embodiments, only the ambient temperature and the desired setpoint temperatures are used as criteria for processor 500 to calculate the expected thermal response.

Processor 500 may utilize the capacity of heating system 102 and/or cooling system 104, along with the ambient temperature and setpoint temperature, to calculate expected thermal responses. In this embodiment, the capacity of heating system 102 and/or cooling system is retrieved from memory 502 and used to help calculate expected temperatures vs. time using the ambient temperature, the desired setpoint temperature and the capacity information. For example, if the capacity of heating system 102 is 150,000 BTU, which may be considered to be a very large heating capacity, processor 500 may calculate expected temperatures vs. time that quickly ramp from the ambient temperature to the desired setpoint temperature, for example, 10 minutes. On the other hand, if the capacity of heating system 102 is only 50,000 BTU, this may be considered a small heating system, and processor 500 may calculate expected temperatures vs. time that much more slowly ramp from the ambient temperature to the desired setpoint temperature, for example, given the same ambient temperature and setpoint temperature is in the previous example, 30 minutes. Of course, calculation of the temperatures vs. time during each thermal ramp is dependent, in part, on the difference between the ambient temperature and the setpoint temperature. The greater the difference, the longer it will take heating system 102 or cooling system 104 to attain the setpoint temperature.

In a related embodiment, memory 502 stores one or more characteristics of structure 100 to better calculate expected thermal responses. For example, memory 502 could store characteristics such as square footage, ceiling heights, number of floors, insulation type, number of windows, status of window treatments, a location of structure 100, sun exposure, and number of occupants, received by manual entry via graphical user interface 506 or mobile device 122. Characteristics that tend to speed up heating or cooling cycles include smaller square footages, lower ceiling heights, one-floor construction, better insulation, a number of windows, a location of structure 100 in warmer/cooler climates, low/high sun exposure and fewer occupants, and versa. Thus, if a particular cooling cycle, for example, begins at an ambient temperature of 80 degrees with a setpoint temperature of 72 degrees, the time to cool an area inside structure 100 to 72 degrees, where structure 100 comprises one or more of the aforementioned characteristics that tend to speed up heating and cooling cycles will be less than the time to cool an area inside structure 100 comprising one or more of the aforementioned characteristics that tend to slow down heating and cooling cycles.

In one embodiment, processor 500 utilizes current or future outdoor weather, along with the ambient indoor temperature and setpoint temperature, to calculate, or modify one or more existing, expected thermal responses. Such current or future outdoor weather may comprise one or more current and/or future outdoor temperatures, precipitation, wind speed and direction, cloud coverage, and other current and future weather-related information. Generally, processor 500 will use the current outdoor weather information to calculate expected thermal responses of a setpoint that is about to occur. In other embodiments, processor 500 uses predicted outdoor temperatures to calculate expected thermal responses for setpoints that will occur in the future, using the predicted outdoor temperature at the time when a future setpoint begins. For example, if the current outdoor temperature is 30 degrees, and a wake setpoint will occur in 1 minute, with an ambient indoor temperature of 63 degrees and a desired setpoint temperature of 70 degrees, processor 500 may calculate a thermal response for this setpoint that indicates the indoor, ambient temperature rising more slowly than if the outdoor temperature was 50 degrees.

In one embodiment, processor 500 utilizes results from previous thermal ramps, along with the ambient indoor temperature and setpoint temperature, to calculate expected thermal responses. In this embodiment, processor 500 stores sets of ambient indoor temperatures over time during heating or cooling cycles in memory 502, obtained from temperature sensor 508, for example, one temperature reading per minute. Other information may be stored in association with each heating/cooling cycle as well, such as humidity, door or window status (i.e., open or closed), and/or weather conditions during each heating/cooling cycle. In some embodiments, the rate at which temperature readings are stored in memory 502 may be greater near the beginning and end of a heating or cooling cycle, in order to get a better idea of how the temperature is changing during a non-linear portion of a heating or cooling cycle. For example, when heating system 102 begins heating an area inside structure 100, little or no change in the ambient temperature may be detected for the first few minutes, as warm air from heating system 102 begins to displace cooler ambient air in an area inside structure 100. During this time, processor 500 may store ambient indoor temperatures at a rate of one reading every 30 seconds in order to capture the nuanced temperature differences as the ambient temperature begins to respond to the heating cycle. Then, once the cool ambient air has been replaced by warm air from heating system 102, the ambient air begins to heat generally linearly, i.e., at more or less of a constant rate. During this time, processor 500 may store ambient indoor temperatures at a rate of one reading every 60 seconds. Likewise, near the end of the heating cycle, i.e., when the ambient indoor temperature approaches the desired setpoint temperature, heating system 102 may shut off its heating element and allow the ambient indoor temperature to "ease" into the desired setpoint temperature at a rate more slowly than in the linear portion of the heating cycle. During this time, processor 500 may again store ambient indoor temperatures at a rate of one reading every 30 seconds, in order to capture the nuanced temperature differences as the ambient temperature approaches the setpoint temperature.

For any setpoint, processor 500 may compare the current ambient indoor temperature and the desired setpoint temperature to the stored ambient indoor temperatures and related setpoints to determine a best match to the current ambient indoor temperature and desired setpoint temperature. For example, if the current ambient indoor temperature is 82 degrees and a desired setpoint temperature is 72 degrees, processor 500 may determine a best match of a previous cooling cycle that began at an ambient temperature of 82 degrees had having a desired setpoint temperature of 72 degrees. If an exact match is not found, processor 500 may place more weight on either the ambient temperature, or the desired setpoint temperature in order to obtain a best match. For example, if no data is available in memory 502 for an ambient indoor temperature of 82 degrees with a desired setpoint temperature of 72 degrees, processor 500 may determine a best match of previously stored data having a starting ambient indoor temperature of 70 degrees with a desired setpoint temperature of 72 degrees. In another embodiment, processor 500 determines a best match by comparing a temperature difference between the current ambient indoor temperature and the desired setpoint temperature to the temperature difference of each pair of starting ambient temperatures and associated desired setpoint temperatures stored in memory 502. The starting ambient temperature and desired setpoint temperatures stored in memory 502 having the closest differential to the current ambient temperature and desired setpoint temperature may be considered by processor 500 to be the closest match. In some embodiments, this method is not considered by processor 500 when either the current ambient indoor temperature and/or the desired setpoint temperature is more than a predetermined number of degrees outside of stored ambient temperatures and associated desired setpoint temperatures, respectively.

In some embodiments, processor 500 uses other information stored in association with the ambient indoor temperatures and desired setpoint temperatures to determine a best match. For example, memory 502 may store two previous thermal ramps, each beginning at an ambient indoor temperature of 64 degrees and each having a desired setpoint temperature of 72 degrees. However, one of these ramps was recorded while a window was open (as determined by a security sensor 514), featuring a relatively gentle ambient temperature gradient, due to some of the heat from heating system 102 escaping out of the open window, and the other ramp recorded while all doors and windows were shut, resulting in a steeper ambient temperature thermal gradient, due to all of the heat from heating system 102 remaining inside structure 102. In this example, processor 500 determines that the current ambient indoor temperature is 64 degrees, that the desired setpoint temperature is 72 degrees, and that a window is open. Thus, processor 500 selects the previously-stored thermal ramp information stored in memory 502 that matches the 64 degree ambient indoor temperature, the 72 degree desired setpoint temperature and the fact that a window is open. Of course, processor 500 could select a previously-stored thermal ramp using one or more other informational elements stored in memory 502, either additionally or in alternatively, such as humidity and/or weather conditions to select a best match of previously-stored thermal ramp information.

After processor 500 determines a best match of the current ambient indoor temperature and desired setpoint temperature in memory 502, processor 500 uses the actual, stored temperature readings associated with the selected, stored ambient indoor temperature and associated desired setpoint temperature as a basis of a current, expected thermal response associated with an upcoming setpoint. Some or all of these temperatures may be modified by processor 500 based on other factors, such as current/expected humidity conditions, current or future status of any doors or windows or window treatments (i.e., open or closed), current or future weather conditions, etc.

In one embodiment, processor 500 utilizes an open or closed status of one or more doors and windows of structure 100, along with the ambient indoor temperature and desired setpoint temperature, to calculate, or modify one or more existing, expected thermal responses. Any open door or window during a heating or cooling cycle can reduce the efficiency of the cycle, resulting in longer times to achieve the desired setpoint temperature. In this embodiment, processor 500 may calculate an expected thermal response based on any of the foregoing methods (i.e., linear, modified linear, system capacity-based, outdoor temperature compensation, previous thermal responses) and increase the time needed for heating or cooling at a first predetermined amount for each door or window that is open during a heating or cooling cycle. For example, if it takes 20 minutes for cooling system 104 to cool an area inside structure 100 from 80 degrees to 70 degrees with all doors and windows closed, processor 500 may increase the time needed to achieve the desired setpoint temperature to 25 minutes if one door or window is open, 30 minutes if two doors or windows are open, etc. In some embodiments, some of the doors and windows may be given a higher weight to alter the heating/cooling times when they are located next to air vents, or if they are denoted as "large" by a user.

In a similar manner, the status of window treatments during a heating or cooling cycle can reduce the efficiency of the cycle, resulting in longer times to achieve the desired setpoint temperature. The start times may therefore be adjusted to consider the status of such window treatments and/or the status of such window treatments could be automatically changed as needed to minimize or augment their impact on the desired indoor environment.

In one embodiment, processor 500 uses a current state of occupancy of one or more areas inside structure 100, along with the ambient indoor temperature and desired setpoint temperature, to calculate, or modify one or more existing, expected thermal responses. In this embodiment, processor 500 receives occupancy signals from one or more occupancy sensors 128, either via network interface 504 or a dedicated, prior art receiver of thermostat 106. For an upcoming heating setpoint, processor 500 generally reduces the time necessary to bring an area inside structure 100 to the desired setpoint temperature when structure 100 is occupied by one or more people. The more people, the faster the expected thermal response, as each person emits heat from their body, contributing to a warming of the ambient air inside structure 100. Alternatively, for an upcoming cooling cycle, processor 500 generally increases the time necessary to bring an area inside structure 100 to the desired setpoint temperature when structure 100 is occupied by one or more people. The effect of body heat inside structure 100 generally becomes more pronounced as more and more people are inside structure 100, and this effect may not be linear, and may further be dependent on the size of structure 100. For example, if structure 100 is 800 square feet, the ambient indoor temperature will be little changed when one or two people are present, but may be impacted to a modest extent when four people are present, and largely impacted when 10 or more people are present. However, in a large structure, such as 3,000 square feet, the ambient temperature inside structure 100 may not begin to be affected until 10 people are present. In one embodiment, processor 500 generates or modifies one or more expected thermal responses based on information stored in memory 502. For example, processor 500 may increase, or decrease, the expected thermal response (i.e., the time it takes for an area inside structure 100 to achieve a desired setpoint temperature) as each new person arrives, or leaves, structure 100. In one embodiment, this is achieved by storing a numeric factor in memory 502 for a number of people that may occupy structure 100. For example, the factor may be "1" (i.e., no change) when 1-3 people are detected inside structure 100, 1.2 if 4-6 people are present, and 1.5 if 7-10 people are present. The factor influences the expected thermal response by increasing, by a multiplication of the expected thermal ramp time by the factor, the expected thermal ramp time, during cooling cycles and decreasing, by dividing the expected thermal ramp time by the factor, the expected thermal ramp time, during heating cycles.

In one embodiment, processor 500 may generate a message to a user of thermostat 106 to perform one or more actions, either prior to, or during, a heating or cooling cycle, to more efficiently and expeditiously heating or cooling an area inside structure 100. For example, just prior to a heating cycle, processor 500 may determine that one or more doors or windows or window treatments are open or closed from signals received from one or more security sensors 514. In response, processor may generate a suggestion to change the state of the monitored elements, e.g., to "close all doors and windows" or more specifically, "close window near front door." The message may be displayed on graphical user interface 506 and/or transmitted to mobile device 122, where mobile device 122 causes the message to be displayed to a user, for example, in the form of a text message. The system may also perform such actions automatically with or without obtaining prior consent from a user. When a change is state is detected, processor 500 may calculate a new, estimated thermal response based on the knowledge that the user has closed or opened one or more open doors, windows, and/or window treatments. For example, a current expected thermal response might change from having a slope of ⅕$^{th}$ to a slope of ¼$^{th}$, or the slope remains unchanged, but the time to achieve the desired setpoint temperature is shortened.

As noted, processor 500 may generate one or more blind control signals to cause one or more window blinds to close prior to, or during, a cooling cycle. In this embodiment, some of the windows of structure 100 may be outfitted with motorized blinds, such as Insynctive® brand of motorized blinds sold by Pella Corporation of Pella, Iowa. The motorized blinds are typically controlled by either a dedicated remote control, or via a specialized app running on mobile device 122, and often wireless control signals are routed to such motorized blinds via LAN 114. Processor 500 may be provided an open/close status of one or more motorized blinds via LAN 114 and network interface 504. If processor 500 determines that one or more motorized blinds are open (or closed) prior to, or during, a cooling cycle, processor 500 may cause one or more of the blind control signals to be transmitted to the one or more blinds, the blind control signs(s) instructing each motorized blind to close (or open as needed). In one embodiment, processor 500 only sends one or more blind control signals when thermostat 106 is operating in specific mode of operation. In response to transmitting the blind control signal(s), or upon receiving confirmation from the one or more motorized blinds that each blind has actually been closed (or opened), processor 500 may calculate a new, estimated thermal response based on the knowledge that one or more blinds have been closed (or opened). It will be appreciated that the same can be performed for all types of window treatments, such as curtains, shutters, etc. Preferably data is provided to the controller from the sensor in near real-time so the system may quickly react to the presence of an obstruction.

To automatically control the blinds, it is contemplated that a hybrid network solution can be implemented comprising a 2-way wireless and or serial communication with connected sensors such as a heat sensor (calibrated by zone, wall location, or by room). Integration with 3$^{rd}$ party controls using a solar type sensor for automating the event based on time of day (TOD) (e.g. morning, noon, evening) can also be utilized. In this manner, system operation may include communication between one or more motorized shades that communicate with the HVAC to determine the hottest wall (based on sensor data) and automatically close the shutter for that wall based on sensor data. The feedback from the shade now being closed may then trigger a sub-event to postpone the HVAC cycle starting for a predetermined period of time.

When blinds are caused to be lowered via use of the controller 118, whether manually or automatically, it is desirable to have the controller 118 stop the lowering process in the event something is detected as blocking the progress of the blind. To this end, a blind may be equipped with one or more sensors for sensing an obstruction that has been placed into the path of travel of the blind, for example a coffee cup placed onto a windowsill. The one or more sensors could be integrated into the blind or could be sensors that are attachable to existing blinds. In one example, the sensor comprises a motion sensor and the motion sensor may be an accelerometer. The blind is operated and caused to be lowered to its desired position while the accelerometer captures data associated with this movement of the blind. Thereafter, if the blind is operated and any deviation from that prior captured movement data is detected, typically with some threshold amount of deviation being acceptable, the blink is caused to immediately stop its movement. The sensor will be in communication with the controller 118 and, while the controller 118 will be responsible for controlling the motor by which the blind is driven, the capturing of data during the configuration phase and operation phase and the comparing of such data may be performed at the sensor, at the controller 118, and/or at a remote device as desired. In other examples, the sensor could be a distance sensor that is used to measure a distance between a bottom of the blind and the windowsill as the blind travels downward, or the like.

As will be appreciated, all use cases described herein may be managed by a background app installed on a cell phone that may display notifications to the user (e.g., the HVAC cool cycle will start in 15 minutes and it's raining outside, do you want to stop the operation until its warmer outside? (e.g. the temperature rises above 68 degrees?)). Likewise, all use cases may involve integration with a smart home hub device, such as Amazon's Alexa and appropriated installed back-end skills. As needed, a smart bridge device (e.g. a Zigbee hub) may be integrated into the system to allow communication between the smart control devices such as Amazon, Google, etc. and the user's cell phone app. In this manner, control over the various devices, such as doors, windows, window treatments, can be performed via use of an app where the app integration into the system will provide for app control, voice control, and solar control based on sensor data being sent to the phone app.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method, performed by a controller, for controlling operation of a window treatment installed within a window frame of a structure comprising:

using a distance sensor attached to a bottom of the window treatment to obtain a first data, the first data comprising distances, as measured by the distance sensor, between the bottom of the window treatment and a windowsill of the window frame as the window treatment is moved from a first position to a second position that is closer to the windowsill relative to the first position;

causing the first data to be stored in memory;

receiving a current temperature data from a temperature sensor within the structure;

receiving a weather data from a weather service;

using a setpoint temperature for the structure as read from the memory, the current temperature data, and the weather data to determine that the window treatment needs to be closed in order to facilitate a movement of the current temperature within the structure towards the setpoint temperature;

causing a first instruction to be provided to the window treatment to cause the window treatment to move from a current position towards the second position;

using the distance sensor to obtain a second data, the second data comprising distances, as measured by the distance sensor, between the bottom of the window treatment and the windowsill as the window treatment is moved from the current position towards the second position;

comparing the first data to the second data while the window treatment is being moved as a result of the first instruction; and when the comparison indicates that an obstruction exists in a path of travel of the window treatment, causing a second instruction to be provided to the window treatment to cause the window treatment to stop moving.

2. The method of claim 1, further comprising receiving a sunlight data from light sensor and using the setpoint temperature for the structure as read from the memory, the current temperature reading, the weather data, and the sunlight data to determine that the window treatment needs to be closed in order to facilitate the movement of the current temperature with the structure towards the setpoint temperature.

3. The method of claim 1, further comprising automatically controlling a state of the window treatment as a function of a time of day when not causing the window treatment to be closed to facilitate the movement of the current temperature within the structure towards the setpoint temperature.

4. The method of claim 1, wherein the controller is an integral component of a thermostat and the thermostat controls at least one of a heating system and a cooling system.

5. The method of claim 1, wherein the window treatment comprises a blind moveable in a vertical direction.

6. A method, performed by a controller, for controlling operation of a window treatment installed within a window frame of a structure comprising:

using a distance sensor attached to a bottom of the window treatment to obtain a first data, the first data comprising distances, as measured by the distance sensor, between the bottom of the window treatment and a windowsill of the window frame as the window treatment is moved from a first position to a second position that is closer to the windowsill relative to the first position;

causing the first data to be stored in memory;

using a current time of day to determine that the window treatment needs to be closed;

causing a first instruction to be provided to the window treatment to cause the window treatment to move from a current position towards the second position;

using the distance sensor to obtain a second data, the second data comprising distances, as measured by the distance sensor, between the bottom of the window treatment and the windowsill as the window treatment is moved from the current position towards the second position;

comparing the first data to the second data while the window treatment is being moved as a result of the first instruction; and when the comparison indicates that an obstruction exists in a path of travel of the window treatment, causing a second instruction to be provided to the window treatment to cause the window treatment to stop moving.

7. The method of claim 6, wherein the controller is an integral component of a thermostat and the thermostat controls at least one of a heating system and a cooling system.

8. The method of claim 6, wherein the window treatment comprises a blind moveable in a vertical direction.

9. A method, performed by a controller, for controlling operation of a window treatment installed within a window frame of a structure comprising:

using a distance sensor attached to a bottom of the window treatment to obtain a first data, the first data comprising distances, as measured by the distance sensor, between the bottom of the window treatment and a windowsill of the window frame as the window treatment is moved from a first position to a second position that is closer to the windowsill relative to the first position;

causing the first data to be stored in memory;

receiving a sunlight data from light sensor;

using the sunlight data to determine that the window treatment needs to be closed;

causing a first instruction to be provided to the window treatment to cause the window treatment to move from a current position towards the second position;

using the distance sensor to obtain a second data, the second data comprising distances, as measured by the distance sensor, between the bottom of the window treatment and the windowsill as the window treatment is moved from the current position towards the second position;

comparing the first data to the second data while the window treatment is being moved as a result of the first instruction; and when the comparison indicates that an obstruction exists in a path of travel of the window treatment, causing a second instruction to be provided to the window treatment to cause the window treatment to stop moving.

10. The method of claim 9, wherein the controller is an integral component of a thermostat and the thermostat controls at least one of a heating system and a cooling system.

11. The method of claim 9, wherein the window treatment comprises a blind moveable in a vertical direction.

* * * * *